US011254432B2

(12) United States Patent
Pfinder et al.

(10) Patent No.: US 11,254,432 B2
(45) Date of Patent: Feb. 22, 2022

(54) STORAGE COMPARTMENT FOR THE OVERHEAD REGION OF A PASSENGER CABIN

(71) Applicant: DIEHL AVIATION LAUPHEIM GMBH, Laupheim (DE)

(72) Inventors: Dirk Pfinder, Balzheim (DE); Markus Rafler, Ichenhausen (DE)

(73) Assignee: Diehl Aviation Laupheim GmbH, Laupheim (DE)

( * ) Notice: Subject to any disclaimer, the term of this patent is extended or adjusted under 35 U.S.C. 154(b) by 877 days.

(21) Appl. No.: 16/027,421

(22) Filed: Jul. 5, 2018

(65) Prior Publication Data

US 2019/0009909 A1 Jan. 10, 2019

(30) Foreign Application Priority Data

Jul. 8, 2017 (DE) ..................... 10 2017 006 493.8

(51) Int. Cl.

*B64D 11/00* (2006.01)
*E05F 1/10* (2006.01)
*E05F 5/06* (2006.01)
*E05F 15/75* (2015.01)
*E05F 5/10* (2006.01)

(52) U.S. Cl.

CPC ............. *B64D 11/003* (2013.01); *E05F 1/10* (2013.01); *E05F 1/1091* (2013.01); *E05F 5/06* (2013.01); *E05F 5/10* (2013.01); *E05F 15/75* (2015.01); *E05Y 2900/502* (2013.01)

(58) Field of Classification Search

CPC ............................ B64D 11/003; E05F 1/1091
See application file for complete search history.

(56) References Cited

U.S. PATENT DOCUMENTS 8,028,957 B2 10/2011 Wolf et al.
8,770,515 B1 7/2014 Cloud et al.
(Continued)

FOREIGN PATENT DOCUMENTS

DE 102004049700 A1 4/2006
DE 102006045189 B4 11/2008
(Continued)

*Primary Examiner* — Brian M O'Hara

(74) *Attorney, Agent, or Firm* — Laurence A. Greenberg; Werner H. Stemer; Ralph E. Locher

(57) ABSTRACT

A storage compartment for the overhead region of a passenger cabin of a passenger aircraft has a carrier which can be mounted in the passenger aircraft, and a pivoting part for receiving a storage item. The pivoting part is mounted on the carrier so as to be pivotable about a pivot axis in a pivoting region between an open position and a closing position. The storage compartment further contains a closing force module. The closing force module contains a switching module by which the closing force module can be brought into an active state or into a passive state. In the active state, a greater closing moment is brought about in the direction of the closing position on the pivoting part by the closing force module, at least in a partial region of the pivoting region, than in the passive state. The closing force module is configured free from electricity with respect to the generation of the closing moment and/or with respect to the switching over between the active state and passive state.

14 Claims, 4 Drawing Sheets

(56) References Cited

U.S. PATENT DOCUMENTS

| | | | | |
|---|---|---|---|---|
| 9,205,924 | B2 * | 12/2015 | Geng | B64D 11/003 |
| 9,296,479 | B1 | 3/2016 | Eakins | |
| 10,106,258 | B2 * | 10/2018 | Kammerer | B64D 11/003 |
| 10,315,768 | B2 * | 6/2019 | Schorkhuber | B64D 11/003 |
| 10,836,492 | B2 * | 11/2020 | Boerschig | B64D 11/003 |
| 2008/0035794 | A1 | 2/2008 | Steinbeck et al. | |
| 2008/0073462 | A1 | 3/2008 | Wolf et al. | |
| 2014/0246968 | A1 | 9/2014 | Geng | |
| 2016/0236781 | A1 | 8/2016 | Savian et al. | |

FOREIGN PATENT DOCUMENTS

| | | | |
|---|---|---|---|
| EP | 2995554 | A1 | 3/2016 |
| WO | 2015179889 | A1 | 12/2015 |

* cited by examiner

STORAGE COMPARTMENT FOR THE OVERHEAD REGION OF A PASSENGER CABIN

CROSS-REFERENCE TO RELATED APPLICATION

This application claims the priority, under 35 U.S.C. § 119, of German application DE 10 2017 006 493.8, filed Jul. 8, 2017; the prior application is herewith incorporated by reference in its entirety.

BACKGROUND OF THE INVENTION

Field of the Invention

The invention relates to a storage compartment for the overhead region of a passenger cabin of a passenger aircraft.

Storage compartments for the overhead region of a passenger cabin of a passenger aircraft, what are referred to as overhead storage compartments (OHSCs), are known in practice. A pivoting part of the storage compartment is lowered by hand by a user during opening and is raised during closing. The pivoting part serves for receiving a storage item. Loading of the pivoting part with a storage item causes the overall mass thereof to increase. The overall mass has to be moved during the opening or closing of the pivoting part. This frequently requires a not inconsiderable operating force by the user.

SUMMARY OF THE INVENTION

It is the object of the present invention to specify an improved storage compartment.

The object is achieved by a storage compartment for the overhead region of a passenger cabin of a passenger aircraft. Preferred or advantageous embodiments of the invention and other invention categories emerge from the further claims, the description below and the attached figures.

The storage compartment contains a carrier. The carrier can be mounted in the passenger aircraft. The storage compartment contains a pivoting part. The pivoting part serves for receiving a storage item. The pivoting part is mounted on the carrier so as to be pivotable about a pivot axis. The pivoting part can be pivoted here about the pivot axis in a pivoting region between an open position and a closing position. The pivoting region is an angular region about the pivot axis. Insertion and removal of a storage item are possible and intended in the open position.

The storage compartment contains a closing force module. The closing force module contains a switching module. The switching module serves to bring the closing force module into an active state or into a passive state, i.e. to switch over between said two states.

In the active state, a closing moment is brought about in the direction of the closing position by the closing module, at least in a partial region, i.e. a partial angular region, of the pivoting region. The same is true in the passive state, but here either a smaller closing moment than in the active state or no closing moment at all is brought about by the closing module (closing moment is zero). In particular, a closing moment is therefore applied exclusively in the active state. In the passive state, the closing force or the closing moment is then equal to zero, that is to say, the closing force module does not bring about any closing moment whatsoever on the pivoting part. In particular in the passive state, there is therefore no force/moment assistance whatsoever with respect to the manual closing or opening of the pivoting part.

The closing force module is configured free from electricity with respect to the generation of the closing moment and/or with respect to the switching over between the active state and the passive state. The expression “free from electricity” should be understood as meaning that no electrical, electronic, electromechanical or other electricity-based elements whatsoever are involved. In particular, the closing force module is configured purely mechanically in respect of the closing moment and switching over.

The closing moment is a torque about the pivot axis and, at a point of action, for example a handle of the pivoting part, which is provided according to the specification for actuation by a user, is associated with a closing force which is correspondingly available there or is to be applied. In the respective states, the closing moment is either constant, but can also be variable or changeable. The closing moment can thus be dependent, for example, on the pivoting angle in the respective state. In such a case, the transition between the active state and the passive state can also take place seamlessly in respect of the closing moment.

The invention therefore permits variable closing force assistance at the pivoting part without an electrical connection of the storage compartment being required in this respect. Nevertheless, for different use situations a variable closing force assistance can take place on account of the active or passive state and the criteria for switching over between them, or the closing force assistance can be switched on or off.

The closing moment assists a user during the closing of the pivoting part since the required closing force to be applied is reduced. During the opening, the user has to apply only a reduced holding force during the lowering of the pivoting part, i.e. has to support or counterhold the pivoting part less. The closing moment therefore acts as a holding force directed counter to the opening movement during the opening of the pivoting part.

In a preferred embodiment, the switching module contains a rocking device which is dependent on a mass of the storage item in the pivoting part. By means of the switching module which is controlled by the rocking device, the closing force module is brought into the active state when the pivoting part is loaded with a storage item of a mass greater than a limit mass. Otherwise, the closing force module is brought into the passive state by the switching module.

The states or the switching over therebetween are/is therefore dependent on the mass of the storage item inserted in the pivoting part. Switching over between the active state and the passive state therefore takes place depending on the state of loading of the pivoting part, wherein, when the loading increases, either in general a closing moment is switched on or the closing moment is at any rate increased from the passive state towards the active state. During operation of the storage compartment or pivoting part, in the event of a relatively large storage item mass a user is therefore assisted in the first place or by a relatively large closing moment.

In a preferred variant of this embodiment, the rocking device has a sliding section along which the pivoting part is displaceable in the carrier. An additional degree of freedom of movement therefore arises at the pivoting part: in addition to the pivoting movement about the pivot axis, the pivoting part can additionally be displaced independently thereof along the sliding section in the carrier. The sliding section runs here in particular in a transverse plane with respect to the pivot axis.

In an inoperative orientation of the storage compartment, the sliding section has at least one direction component in the direction of gravitational force. The inoperative orientation is that when in the storage compartment is located in its specified installation position in the aircraft and the aircraft is oriented flat at rest, i.e. while standing on the tarmac, in particular during boarding. This is the period of time at which the pivoting parts are normally opened and closed in order to insert or to remove a storage item.

On the sliding section in the direction of gravitational force, the pivoting part is mounted on a spring element of the rocking device. By means of an increasing mass of the pivoting part with a storage item possibly inserted, the spring element is therefore increasingly moved or compressed in the direction of gravitational force, i.e. the pivoting part increasingly moves along the sliding section. The closing force module is brought into the active state when the pivoting part is moved in the sliding section in the direction of gravitational force beyond a switching point corresponding to the limit mass. Otherwise, the closing force module is brought into the passive state.

The spring element is therefore coordinated with respect to the switching point to the limit mass. In particular, the pivot axis and therefore the rotational point of the pivoting part are also displaceable together with the pivoting part along the sliding section, i.e. are lowered as the storage item mass increases. The sliding section therefore extends with a respective component in the direction of gravitational force in the inoperative orientation of the storage compartment.

By loading the pivoting part with a storage item, the overall mass and therefore the weight of the loaded pivoting part increase, and therefore the spring element is compressed even more and therefore the pivoting part moves along the sliding section in the direction of gravitational force or with a movement component in the direction of gravitational force. In the event of loading with the limit mass, the switching point is reached and the closing force module is switched from the passive state into the active state. Switching back into the passive state when a storage item is removed from the pivoting part takes place in a corresponding manner. A simple, non-electric or purely mechanical possibility can thus be provided in order to switch over the closing force module mechanically between the states.

In a preferred variant of this embodiment, the sliding section is a straight line which extends in the direction of gravitational force in the inoperative orientation of the storage compartment. The weight of the loaded pivoting part can therefore be optimally used for compressing the spring element, as a result of which a particularly reliable switching mechanism arises for switching over the closing force module.

In a preferred variant of this embodiment, the limit mass is between 20% and 80%, in particular 33% and 66%, in particular between 40% and 60%, in particular 50% of the specified loading mass for the storage compartment. Depending on the choice of the limit mass, a corresponding size of the closing moment can also be selected. An operating behaviour or force or moment behaviour which can be selected or varied within wide ranges is thus produced for the pivoting part. In particular, the pivoting part remains free from force or moment assistance in a region from the empty state up to a certain loading.

In a preferred embodiment, the closing force module contains a mechanical force accumulator. The force accumulator serves for generating the closing moment. During a movement of the pivoting part towards the closing position, the force accumulator outputs work in the form of the closing moment to the pivoting part.

During a movement of the pivoting part towards the open position, the force accumulator receives work by the closing moment which is overcome by an external action on the pivoting part. The force accumulator is therefore correspondingly configured for outputting and receiving the corresponding work. The corresponding work is stored as mechanical energy in the force accumulator. The output therefore generates the closing moment, and, for the receiving, the closing moment has to be applied by an external force.

The force accumulator is therefore charged with mechanical energy in the open position of the pivoting part and is at least partially or completely discharged in the closing position. The force accumulator is therefore discharged during the closing and charged during the opening. Various corresponding force accumulators are known and available, and therefore a corresponding closing force module can easily be produced.

In a preferred variant of this embodiment, the force accumulator contains a gas-filled compression spring and/or a load cell and/or a spring. In particular, the force accumulator is such an element or one of the elements or a combination thereof. The corresponding force accumulators are suitable particularly for use in the corresponding storage compartment.

In a preferred variant of this embodiment, the closing force module contains at least one mechanically connecting coupling module. The coupling module serves for transmitting the closing moment between force accumulator and pivoting part. This applies to both directions, i.e. both for the charging and for the discharging of the force accumulator. A corresponding coupling module is in particular a V belt and/or a cable pulley and/or a gearwheel and/or a slotted guide mechanism and/or a slip clutch and/or a guide pin, etc. Corresponding coupling modules are sufficiently available and known or can be configured as required, for example depending on the selected force accumulator and the mechanics of the rest of the storage compartment, and therefore a corresponding closing force module can also be produced simply in this regard.

In a preferred variant of this embodiment, the coupling, which is brought about by the coupling module, between force accumulator and pivoting part is produced in the active state and is released in the passive state. This switching over of coupling (production and release of the coupling) also takes place non-electrically, in particular purely mechanically, for example by a displaceable blocking pin, a closable coupling, etc. The switching over between the active state and passive state can thus be configured in a particularly simple manner. In particular, the corresponding release and production of the coupling is brought about by the switching module. The engagement of a switching module on a corresponding coupling module can be configured in a particularly simple and mechanically effective manner.

In a preferred embodiment, in an inoperative orientation of the storage compartment, the closing moment is smaller than an opening moment caused by the effect of gravitational force on the pivoting part and a possibly inserted storage item. A remaining effective torque (holding force) about the pivot axis in the direction of the closing position is therefore always necessary in order to press the pivoting part upwards during the closing and to support same upwards during the opening or to lower same in a controlled manner. The movement of the storage compartment therefore takes place in a classic or conventional or customary manner and can be dealt with intuitively by users, for example passengers of the aircraft. The closing moment therefore merely brings about a force assistance such that the force to be effectively applied by the user is reduced as a whole in comparison to a storage compartment not assisted by a closing moment. In particular, by complete switching off of the closing moment in the passive state, the storage compartment can be operated as customary in the empty state and with the customary force or weight ratios.

There is in each case a minimum consideration for a storage item of a certain mass here: the "most favorable" case is considered, that is, when, at a given storage item mass, the smallest opening moment is produced by the action of gravitational force, for example for a most favorable depositing location, a most favorable distribution or a most favorable density of the storage item, etc. It is therefore ensured that the corresponding statements apply for any possible loading of the storage compartment with any storage item of a certain mass.

In a preferred embodiment, the closing force module has a first pivot bearing about which the pivoting part is rotatable in the active state of the closing force module. The closing force module additionally has a second pivot bearing about which the pivoting part is rotatable in the passive state of the closing force module. The first pivot bearing is configured in particular for generating the relatively large closing moment, the second pivot bearing for generating the smaller closing moment. The movement in the states can also additionally take place about the other pivot bearing in each case as long as the abovementioned conditions with respect to the greater and smaller closing moment are observed in the states.

The "pivot axis" for the pivoting movement therefore breaks up physically into two separate pivot axes. The two pivot axes of the pivot bearings run in particular in parallel and at different heights in the inoperative orientation.

In particular, the abovementioned force accumulator is coupled to the first pivot bearing, but not to the second pivot bearing, and therefore no closing moment is generated at the second pivot bearing. Two different bearings can therefore be used for the active state and the passive state. During the switching over between the states, it therefore merely has to be ensured that the rotation takes place or even does not take place about the respective corresponding bearing. The second pivot bearing therefore in particular does not generate a closing moment, i.e. is a freely rotating pivot bearing, and the first pivot bearing is configured to be spring-mounted or torsion-sprung about the first pivot axis, in particular for applying the closing moment. The closing moments are generated in particular exclusively by the bearings, and therefore otherwise no further moments have to be produced; in particular, no further force or moment generators are therefore necessary.

By means of the division into two different rotational bearings, a closing force module with an active state and passive state can be realized in a particularly simple manner.

In a preferred variant of this embodiment, the first pivot bearing is released by means of the switching module in the active state. In the passive state, the second pivot bearing is released by means of the switching module. The respective other pivot bearing is blocked in the corresponding states by means of the switching module. Release and blocking take place in particular because of the abovementioned loading of a storage item or limit mass. This causes the storage compartment to be pivotable in the two states in each case exclusively about the first or about the second pivot bearing. Purely by switching over the pivoting from the first to the second pivot bearing in combination with two pivot bearings assisted differently in terms of torque, a particularly simple switching over between the active state and passive state can therefore be achieved.

In a preferred variant of this embodiment, the switching module has a respective blocking bolt which, for the respective blocking, is retractable together into respective bearing parts of the respective pivot bearing. In other words, the two bearing parts moving relative to each other during rotation of the bearing are therefore blocked or released in this rotation by means of the blocking bolt. In order to release the blocking, the blocking pin is in particular removed from one of the bearing parts and pulled back into the other bearing part such that the bearing parts can again rotate in relation to each other. In particular, a moving bearing part of the respective bearing is fastened directly or indirectly (e.g. via the other bearing) to the pivoting part, and the other bearing part is fastened directly or indirectly to the carrier, i.e. an unmoving bearing part to the carrier. The pins are in particular guided in a guide channel, the respective channel portions of which are aligned in the bearing parts during the blocking. By means of corresponding embodiments, particularly simple blocking and release of the pivot bearings can be realized.

In a preferred variant of this embodiment, the pivot axes of the first and the second pivot bearing do not coincide, i.e. are not identical or concentric. In particular, the pivot axes run parallel to each other. In particular, the two bearings are moved together as described above along the sliding section by the loading of a storage item, wherein the first bearing lies higher than the second bearing in the inoperative orientation. As the loading increases, the two bearings are then displaced ever further downwards. However, from the limit mass, the lower bearing then becomes ineffective and the upper bearing effective, as a result of which the effective rotational point of the pivoting part is again shifted upwards. Rotational movements of the pivoting part in the active and passive state thus take place about pivot axes of spatial positions of approximately identical height, and therefore, despite the displacement of the pivoting part downwards, there is an overall uniform pivoting behavior of the pivoting part in the active and passive state.

In a preferred embodiment, the switching module contains an end stop module with a movable stop element. The stop element is in particular mounted movably on the carrier. In an end region of the pivoting region or of the pivoting movement adjacent to the open position, the pivoting part or a structural part which is connected thereto lies against the stop element and moves therewith or moves the latter. The stop is configured to spring back towards the open position and is movable as far as the open position along a spring path by the pivoting element or structural part lying there against. The closing force module is brought into the active state when the stop is moved towards the open position beyond a switching point corresponding to the limit mass. Otherwise, the closing force module is brought into the passive state.

The switching module also contains a blocking module which prevents deactivation of the active state when the pivoting part exceeds a limit pivoting angle towards the closing position. The switching module also contains a damper module which prevents the changing between the active state and passive state in an interval of time after the pivoting part has passed an angle corresponding to the switching point towards the open position and/or after it has fallen short of the limit pivoting angle towards the open position and/or after it has experienced a change in mass by a change in the storage item mass. In particular, the damper module permits only a comparatively slow or damped movement of the stop element on the spring path.

During the opening of the pivoting part, the latter (or the structural element thereof) therefore initially passes to the beginning of the end region and is placed here against the stop. In particular, this point is configured in such a manner that the stop is not movable by the empty weight of the pivoting part. During further movement of the pivoting part, the stop is displaced towards the end state. This takes place in particular by loading of the empty storage compartment with an additional storage item or weight. The empty storage compartment therefore does not have sufficient inherent torque in order to move the stop into the end region. At a sufficient loading of the pivoting part with the limit mass, the stop reaches the switching point, and the active state is activated.

During the movement of the pivoting part, assistance therefore now takes place by means of the closing moment. Since, however, at the beginning of the closing, the stop is relieved of load again, it has to be prevented that the passive state is immediately switched back to again. This is brought about by means of the damper module. The latter prevents an immediate deactivation of the active state and maintains the latter at least until the pivoting part has reached the limit pivoting angle towards the closing position. The active state is now blocked or held by the blocking module. The "delay time" of the damper module is dimensioned here in such a manner that a customary speed of movement of the pivoting part is assumed, i.e., for example, times within the range of below one second or up to 2 or 3 seconds.

During an opening movement, the closing force assistance therefore likewise takes place, and the active state is maintained. Even after the limit pivoting angle has been passed (the blocking module becomes ineffective), the passive state would then immediately be activated again since the switching point has not yet been reached. However, this is again prevented by the damper module until the stop again remains moved beyond the switching point because of the loaded storage compartment. Only after the storage compartment is unloaded is the switching point gradually passed again because of the damper module and the passive state activated after expiry of the interval of time. Subsequently, closing of the storage compartment in the empty state takes place without closing moment assistance.

The invention is based on the following findings, observations and considerations and also has the following embodiments. The embodiments are sometimes also simply called "the invention" here. The embodiments here may also contain parts or combinations of the abovementioned embodiments or may correspond thereto and/or may optionally also include embodiments which have not been previously mentioned.

The basic concept of the invention is to permit force assistance without an electrical connection. The invention in particular uses a spring system in order to identify the loading state. At a defined loading state, a mechanical force assistance is switched on.

According to the invention, use is not made of any electronic components. This obviates the need for an expensive electronics qualification, and the system is better suited for retrofitting. According to the invention, force assistance without an electrical connection is therefore produced. According to the invention, a mechanical force assistance is produced for storage compartments with a movable pivoting part, i.e. movable luggage compartments (also called "movable bin"). The invention permits a purely mechanical force assistance for movable bins.

The following basic circumstances are equally present in all of the concepts explained here:

1. A mechanical "force accumulator medium" is available (force accumulator, for example gas-filled compression spring, load cell, spring, etc.) which can output a corresponding force for the purpose of force assistance during the closing of the OHSC bin. The force assistance takes place exclusively whenever a predefined threshold value for loading of the OHSC bin is exceeded; otherwise, the assistance is not activated. The threshold value ideally lies between 33% and 66% of the maximum loading. The mechanical force accumulator medium is already operable and precharged for the first installation.
2. The discharging operation of the mechanical force accumulator medium takes place during closing of the OHSC bin when the exceeding of the threshold value has been identified by an indicator (in particular switching module).
3. The charging operation of the mechanical force accumulator medium which has now been discharged takes place during the opening of the OHSC bin by the potential energy (loading, storage item) of the OHSC bin closed previously with force assistance.
4. The force transmission and the charging/discharging of the mechanical force accumulator medium take place via corresponding mechanically connecting components designed for the concepts (for example a V belt, cable pulley, gearwheels, slotted guide mechanism, slip clutch, etc.).

Among other things, the invention provides the following concepts:

First concept: the rotational point (pivot axis) is designed in such a manner that it is mounted on a spring system (rocking device). Linear guidance in the z direction (direction of gravitational force during inoperative orientation) additionally takes place. If the weight (pivoting part and storage item) now exceeds a predefined value (limit mass), the chute (pivoting part) at the rotational point is lowered (along the sliding section) to an extent such that a pin or similar can engage in a guide (switching module). If the bin (pivoting part) is now closed (slight rotation) and the pin runs in said guide, a mechanical force accumulator (for example a gas-filled compression spring or similar) is activated and assists the closing operation (closing moment).

This force (closing moment) is lower than the required force for the closing (counterweight of pivoting part and storage item), that is to say it (the closing movement) is only assisted. The remaining force has to be applied by the operator.

If the bin is opened again, the latter presses downwards because of its dead weight and can store the potential energy back again in the mechanical force accumulator. The chute simultaneously moves downwards again here. If the chute is unloaded in the lower position and is no longer sufficiently heavy (below the limit mass) for force assistance, the spring system presses the rotational point upwards again and the mechanical force accumulator is locked (passive state). If the chute is closed below the assistance loading, the mechanical force accumulator remains locked and the closing operation is not assisted (lower closing moment is zero).

As a result, a "residual force" (weight force of pivoting part and storage item minus counterforce by closing moment) of the operator is always necessary, which ensures an intuitive operation.

Second concept "rotational point in rotational point": "the rotational point" is also mounted here on a spring system. The embodiment in this case is realized with a rotational point which actually breaks down into two rotational points (two pivot bearings) and "the rotational point" changes since only one of the two intended rotational points is rotatable at each time and the other is blocked. One of the two rotational points (first pivot bearing) is connected to a mechanical force accumulator (spring, gas-filled compression spring, etc.) which assists during the closing operation when the loading threshold has been reached (closing moment when storage item mass is above the limit mass). If this is the outer rotational point, the inner one (second pivot bearing) can be arranged asymmetrically relative to the outer one in order to be able to compensate for the height offset because of the rocking (as the storage mass increases, the pivoting part is displaced downwards in the sliding section). For example, the locking/release of the rotational points can take place by means of bolts or guide profiles on the housing of the luggage compartment.

If the luggage compartment is loaded below the loading limit (pivoting part and storage item are below the limit mass), the inner rotational point which does not have any force assistance is free. The force-assisted rotational point on the outside is blocked in this state.

As soon as the loading limit is exceeded, the inner rotational point is blocked and the outer, force-assisted one is free. As a result, the operator is assisted during the closing of the luggage compartment.

Third concept "rocking at the end stop": In the case of the third concept, a spring damper system (spring belongs to the rocking device, damper belongs to the damper module) is attached to the end stop (stop element). By means of loading, a force acts (via the structural part) on the end stop and the spring system is compressed. From a certain loading (limit mass) and resultantly produced spring path (stop element reaches the switching point by further rotation of the bin towards the open position), a mechanical force accumulator is activated and assists the closing operation when required.

The damper has the task of delaying the switching on or the switching off of the force assistance. During closing by the operator, the spring would otherwise be relieved of load and the force assistance switched off. Similarly, an erroneous switching on of the force assistance by "brisk" loading (dynamic force due to kinetic energy of the storage item) or support of a passenger (on the pivoting part, acts as an additional storage item mass) is eliminated by the damper. After a preset rotational angle (limit pivoting angle towards the closing position), the force assistance is additionally locked (the active state is maintained) until the bin has fallen short of said rotational angle again.

Other features which are considered as characteristic for the invention are set forth in the appended claims.

Although the invention is illustrated and described herein as embodied in a storage compartment for the overhead region of a passenger cabin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
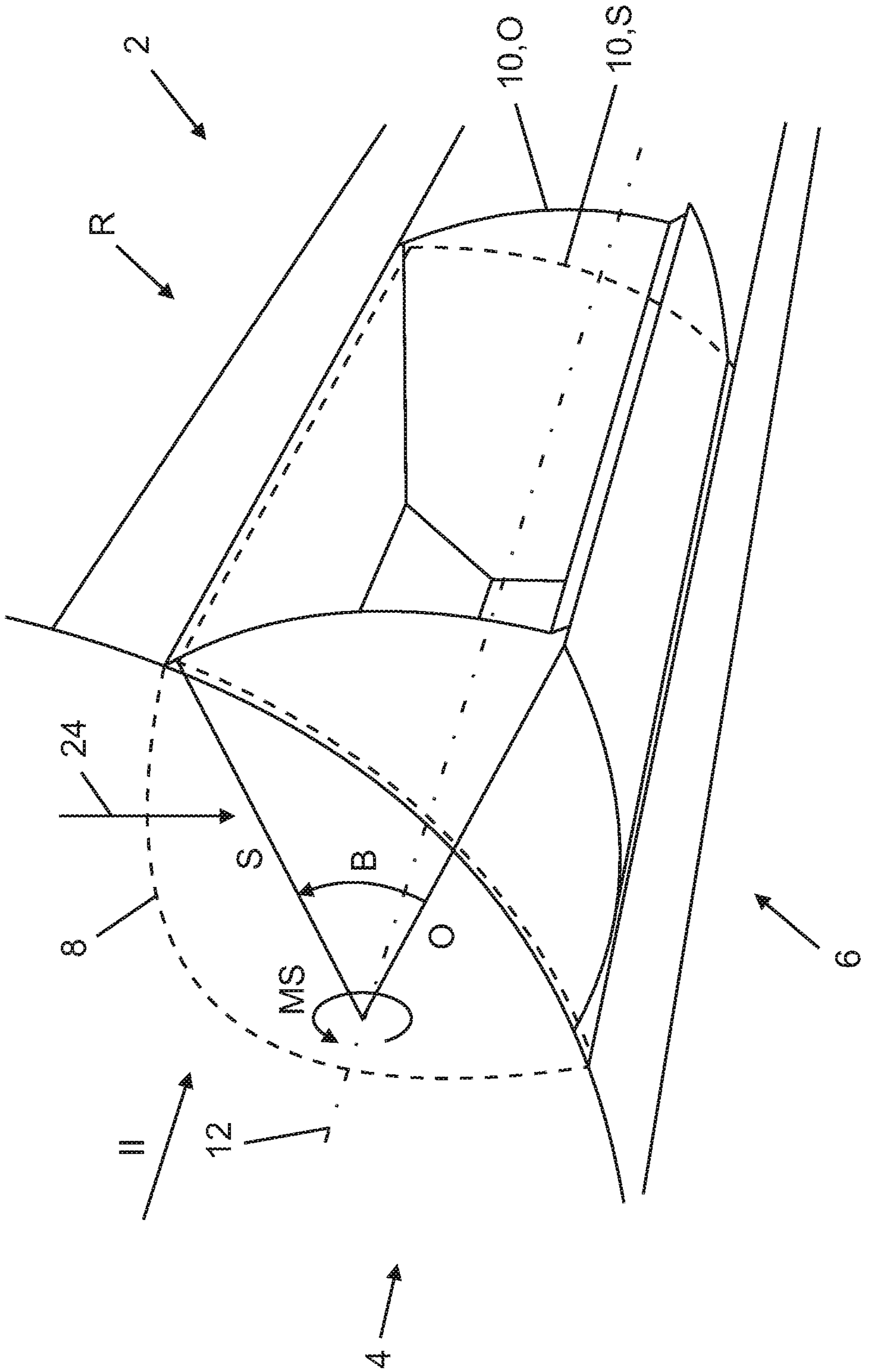
FIG. 1 is a diagrammatic, perspective view of a storage compartment in a passenger cabin according to the invention.

Referring now to the figures of the drawings in detail and first, particularly to FIG. 1 thereof, there is shown a cutout from a passenger aircraft 2 or the passenger cabin thereof with a storage compartment 6 arranged in an overhead region 4. The storage compartment 6 contains a carrier 8 (merely indicated by dashed lines here) which is mounted in the passenger aircraft 2, and a pivoting part 10. The pivoting part 10 is pivotable about a pivot axis 12 between an open position O shown in FIG. 1 and a closing position S (indicated by dashed lines). It moves here from the open position O in the direction of the arrow which is shown through a pivoting region B as far as the closing position S, or vice versa. The pivoting region B is a pivoting angle about the pivot axis 12. FIG. 1 therefore shows a movable luggage compartment of an aircraft.

Figure 2:
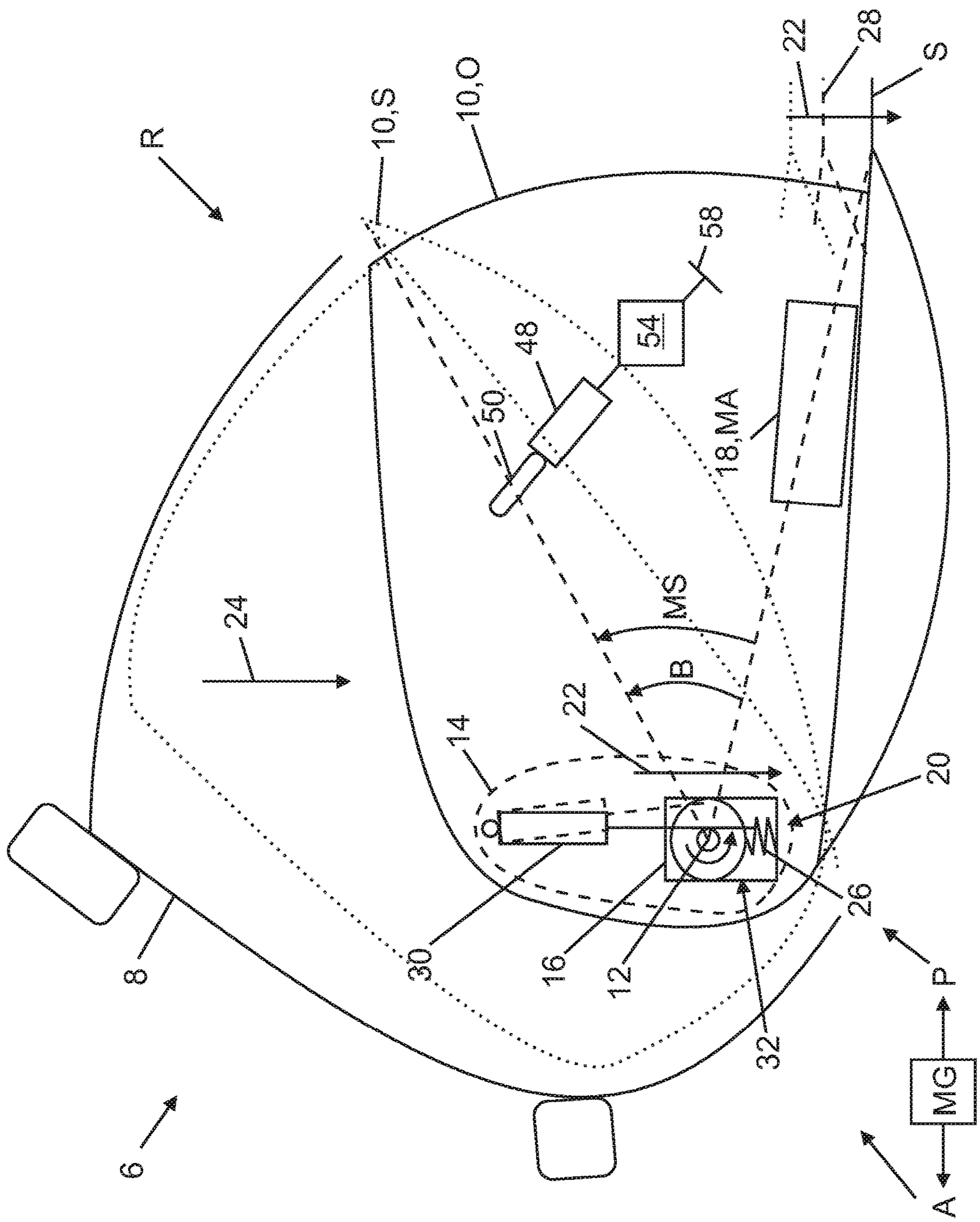
FIG. 2 is a side view of the storage compartment.

FIG. 2 shows the storage compartment 6 from FIG. 1 in a side view in the direction of the arrow II in FIG. 1. The storage compartment 6 contains a closing force module 14 (indicated by dashed lines) which can be brought both into a passive state P and into an active state A. In the active state A, the closing force module 14 brings about a closing moment MS about the pivot axis 12 in the direction of the closing position S, i.e. in the arrow direction, on the pivoting part 10 throughout the pivoting region B. In the passive state P, the closing force module 14 does not bring about any such closing moment. Both the generation of the closing moment MS by the closing force module 14 and the switching over between the active state A and the passive state P are designed free from electricity, that is, purely mechanically. A storage item 18 can be inserted into the pivoting part 10 and is inserted here. The storage item has the mass MA.

The closing force module 14 contains a switching module 16. The latter contains a rocking device 20 which is dependent on the mass MA of the storage item 18 which is inserted in the pivoting part 10 or storage compartment 6. The rocking device 20 is dependent on the mass MA in so far as it causes the switching module 16 to bring the closing force module 14 into the active state A when the mass MA exceeds a limit mass MG, and otherwise to bring same into the passive state P. The limit mass MG here is 50% of the specified loading mass for the storage compartment 6. The rocking device 20 therefore serves for determining at least one dimension for the mass MA. The rocking device 20 contains a sliding section 22 (indicated by an arrow in FIG. 2) along which the pivoting part 10 is displaceable (downwards) in the carrier 8, in addition to the pivoting about the pivot axis 12, by increasing the mass MA. By lowering the mass MA, the pivoting part 10 moves in the opposite direction (upwards). FIG. 2 shows the storage compartment 6 in an inoperative orientation R, that is to say, in a state mounted in the aircraft 2, while the passenger aircraft 2 is resting flat on an underlying surface, here the tarmac. The sliding section 22 here is a straight line which extends in the direction of gravitational force 24. On the sliding section 22, the pivoting part 10 is mounted in the direction of gravitational force 24 on a spring element 26 of the rocking device 20.

The closing force module 14 is brought in the present case here into the active state A since the pivoting part 10 is moved in the sliding section 22 beyond a switching point 28, downwards in the example, i.e. in the direction of gravitational force 24. In an alternative operating state (not illustrated), the storage item 18 is removed, and therefore the pivoting part 10 is not lowered beyond the switching point 28, as indicated by dotted lines. The closing force module 14 is then in the passive state P. For space reasons, the conditions are indicated representatively for the sliding section 22 on the right edge of the pivoting part 10 in the figure.

The closing force module 14 has a mechanical force accumulator 30 for generating the closing moment MS which outputs work here in the form of the closing moment MS only in the active state A, during a movement of the pivoting part 10 towards the closing position S. During a movement of the pivoting part 10 towards the open position O, the force accumulator 30 receives the resulting work by application of the closing moment MS to the pivoting part 10 by an operator (not illustrated). In the passive state P, the force accumulator 30 is ineffective and has no influence on the pivoting movement and is therefore neither charged nor discharged. In the present example, the force accumulator 30 is a gas-filled compression spring.

The closing force module 14 also contains a mechanically connecting coupling module 32 which is only illustrated symbolically in FIG. 2. The coupling module serves for transmitting the closing moment MS between force accumulator 30 and pivoting part 10. In the active state A, the corresponding coupling is produced, and is released in the passive state P. In accordance with the coupling, in the active state A the illustrated piston rod of the gas-filled compression spring is moved in a circular segment guide (merely indicated) when the pivoting part 10 is pivoted in the direction of the open position O. The gas-filled compression spring is compressed here (indicated by dashed lines). The spring is expanded during a countermovement. For this purpose, a pin (not illustrated) engages only in the active state A in the guide and runs in the latter in order to guide the piston rod.

In the inoperative orientation R illustrated, the opening moment action of gravitational force caused on the pivoting part 10, including a possibly inserted storage item 18, both in the active state and in the passive state is greater than the closing moment MS, and therefore a manual force additionally always has to be applied in order to press the pivoting part 10 either in the direction of the closing position S or to support the pivoting part in a controlled manner during a countermovement towards the open position O.

According to FIG. 2, the rotational point (pivot axis 12) is therefore guided in Z (in the inoperative orientation: sliding section in the direction of gravitational force) and mounted on a spring (spring element 26).

Figures 3A, 3B:
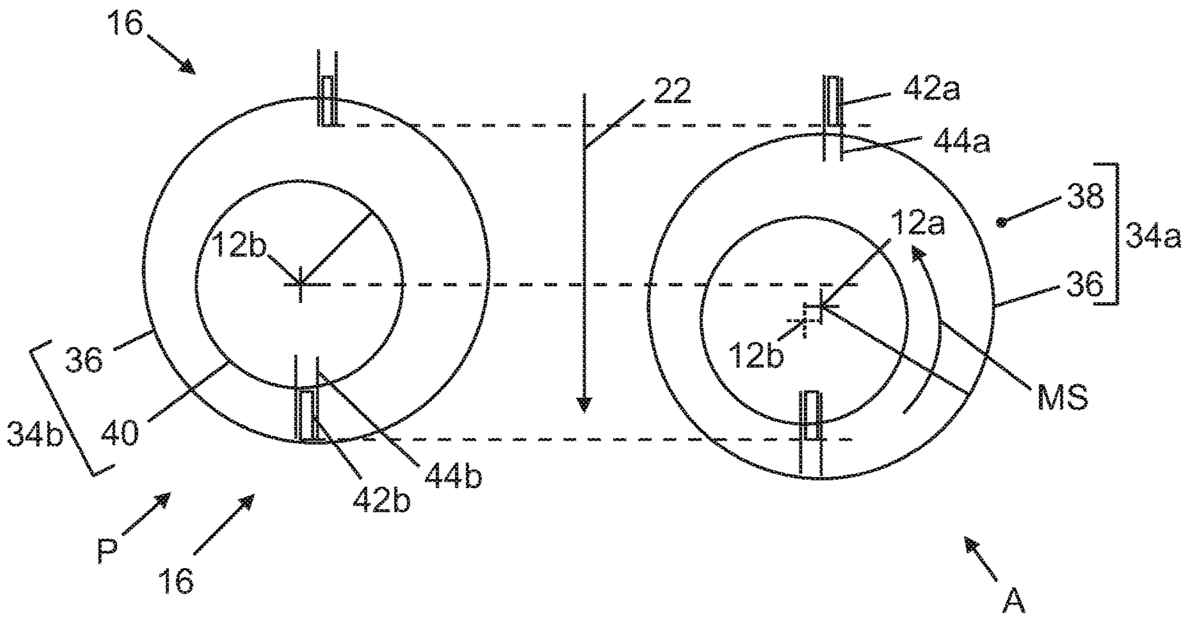
FIGS. 3A and 3B are illustrations of two pivot bearings in an empty storage compartment (FIG. 3A), and a storage compartment with a storage item above the limit mass (FIG. 3B)

FIGS. 3A, 3B show a closing force module 14 for an alternative embodiment of a storage compartment 2. The closing force module has a first pivot bearing 34*a* which is formed by the fact that a running ring 36 is mounted in a bearing shell 38 so as to be rotatable about a first pivot axis 12*a*. The pivoting part 10 is rotatable about said pivot bearing 34*a* in the active state A, as primarily shown in FIG. 3B.

The closing force module 14 contains a second pivot bearing 34*b* which is formed by the fact that the running ring 36 is mounted on a shaft 40 so as to be rotatable about a second pivot axis 12*b*. The pivoting part 10 is pivotable about the second pivot bearing 34*b* in the passive state P, as is primarily illustrated in FIG. 3A. The second pivot axis 12*b* is different from the first pivot axis 12*a*. The first pivot bearing 34*a* is configured for generating the closing moment MS about the pivot axis 12*a*. The second pivot bearing 34*b* does not generate any torque about the pivot axis 12*b*, i.e. is rotatable in this direction in a manner free from force.

The switching module 16 is formed here as follows: in the active state A, the switching module 16 releases the first pivot bearing 34*a* and blocks the second pivot bearing 34*b*, see FIG. 3B. By contrast, in the passive state P, the first pivot bearing 34*a* is blocked and the second pivot bearing 34*b* is released, see FIG. 3A. This takes place by means of a respectively coupled displacement of two blocking bolts 42*a, b* in corresponding guides 44*a, b*. The guide 44*a* is formed from two sections, one in the running ring 36 and one in the bearing shell 38, wherein the sections align during blocking of the pivot bearing 34*a* when the blocking bolt 42*a* projects into the two guide sections (see FIG. 3A). If the bolt 42*a* is pulled back into the bearing shell 38, the pivot bearing 34*a* is rotationally free (see FIG. 3B).

The guide 44*b* is correspondingly formed in the bearing shell 38 and the shaft 40. During blocking, the two sections of the guide 44*b* are also aligned here and the blocking bolt 42*b* projects into the two guide sections (FIG. 3B). If the blocking bolt 44*b* is pulled back into the running ring 36, the bearing 34*a* is rotationally free (FIG. 3A). Since the bolts 42*a, b* are moved synchronously, precisely just one is always pulled back into the running ring 36 or the bearing shell 38 in order to release the relevant pivot bearing 34*a, b*, and the respective other projects into the two guide halves of the corresponding guide 44*a, b* in order to block the correspondingly other pivot bearing 34*b, a*.

Shaft 40, bearing shell 38 and running ring 36 therefore form respective bearing parts of the respective pivot bearings 34*a, b*. For the blocking, the respective blocking bolt 42*a, b* is therefore in each case retracted together into the two bearing parts of the respective pivot bearing 34*a, b*.

The pivot axes 12*a* and 12*b* are therefore different from each other or do not coincide. The effect achieved by this is that, in the active state A (see FIG. 3B), a switch is made from the pivot axis 12*b* to the higher pivot axis 12*a* although the pivot axes 12*a, b* have been displaced downwards in their entirety by introduction of the storage item 18 and movement of the pivoting part 10 in the sliding section 22. The rotation therefore effectively takes place about the pivot axis 12*a* which is nevertheless higher, instead of the lower pivot axis 12*b*.

Figure 4:
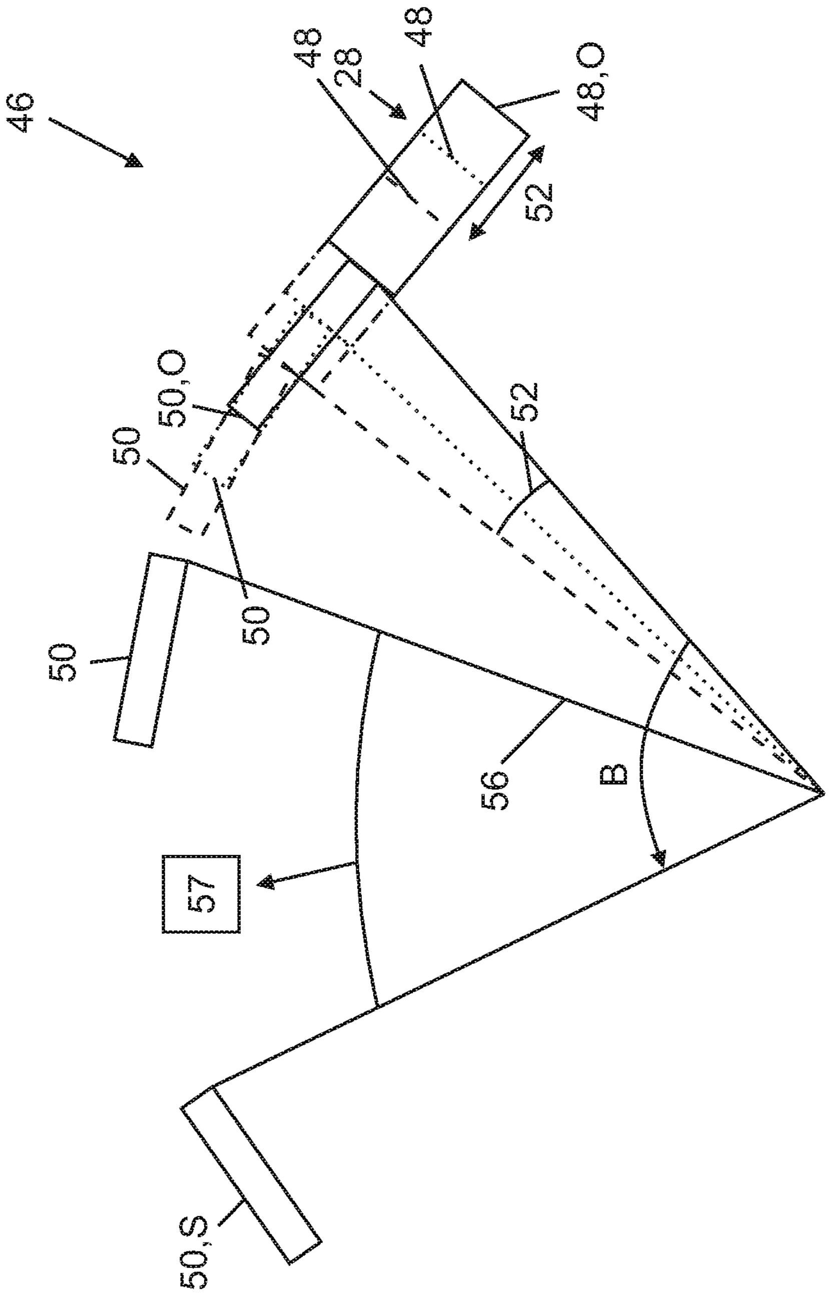
FIG. 4 is a detailed illustration of an end stop module of the storage compartment shown in FIG. 2.

FIG. 4 symbolically illustrates a further embodiment of a switching module 16. The latter here contains an end stop module 46 which is also already indicated in FIG. 2. FIG. 2 therefore shows a side view of an OHSC with an end stop.

Figure 5:
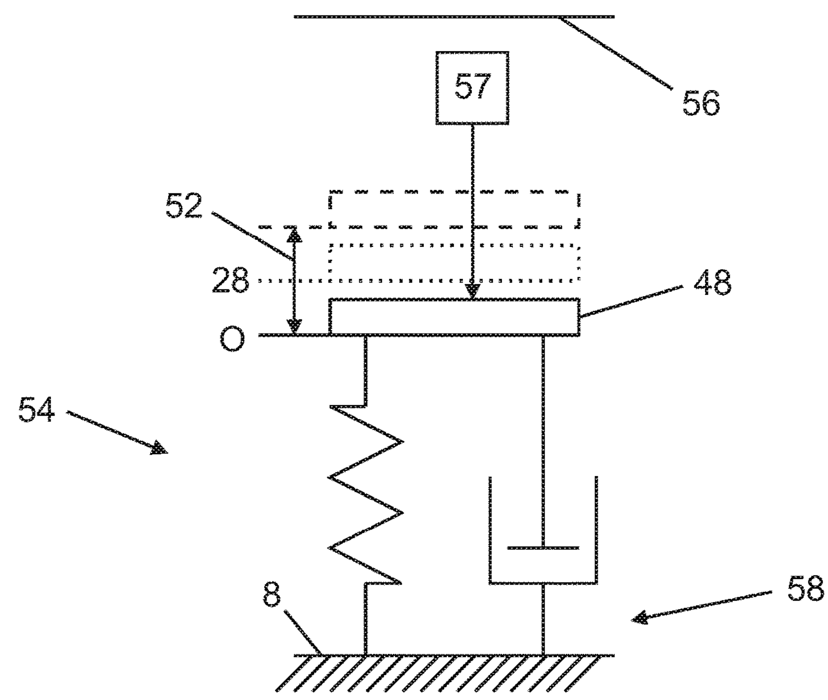
FIG. 5 is an illustration of a spring damper system.

The end stop module 46 contains a stop element 48 which is mounted movably on the carrier 8 and against which the pivoting part 10 can be placed or then lies with the aid of a structural part 50, which is fastened to the pivoting part 10, when the pivoting part 10 is in an end region 52 of the pivoting region B. The end region 52 is adjacent to the open position O or ends there at. From the beginning of the end region 52, the structural part 50 therefore lies against the stop element 48, as illustrated by dashed lines in FIG. 4. The stop 48 is spring-loaded in the direction of the closing position S by a spring (indicated in FIG. 5). By further opening of the pivoting part 10, the latter penetrates further into the end region 52, here by loading with a storage item 18 beginning. The stop element 48 is thus gradually pressed back counter to a corresponding spring force until said stop element has arrived at a switching point 28, indicated here by dotted lines.

From the switching point 28, the closing force module 14 is switched into the active state A. If the pivoting part 10 is now moved in the direction of the closing position S, the stop element 48 is moved again beyond the switching position 28.

However, a damper module 54 (only indicated symbolically in FIG. 5) prevents a mechanical switching over into the passive state P: the damper module is fastened fixedly to the carrier 8 with a fixed section 58. The stop element 48 is guided movably on the carrier 8 via the abovementioned spring and a damper. Owing to the damping, the stop element 48 cannot move sufficiently rapidly back over the switching point 28, and the active state A continues to exist for a length of time. This suffices for the pivoting part 10 to pass a limit pivoting angle 56 towards the closing position S. This is true of a customarily rapid closing movement.

After the limit pivoting angle 56 is exceeded, the active state A is now locked by a blocking module 57 (merely indicated here), i.e. can no longer be released towards the passive state P. The locking takes place by the stop element 48 continuing to be held mechanically on the other side of the switching point 28. During the opening of the pivoting part 10, and when the limit pivoting angle 56 is fallen short of (and the stop element 48 is released), the damper module 54 prevents said stop element from passing the switching point 28 before the structural part 50 lies again against the stop element 48 and the latter is now held again by the structural part 50. The active state A thus continues to be maintained.

Only after the pivoting part 10 is unloaded does the stop element 48 now return back beyond the switching point 28 by a slow movement of the damper module 54, and the closing force module 14 switches again into the passive state P.

In the example, the blocking module 57 therefore brings the stop element 48 into, and holds it in, the end position (shown in extended form) of the open position O. The time between falling short of the limit pivoting angle 56 and exceeding the switching point 28 by means of the structural element 50 is not sufficient in a customarily rapid opening movement in order to allow the stop element 48 to pass beyond the switching point 28.

The following is a summary list of reference numerals and the corresponding structure used in the above description of the invention:

2 Passenger aircraft
4 Overhead region
6 Storage compartment
8 Carrier
10 Pivoting part
12 Pivot axis
12*a* First pivot axis
12*b* Second pivot axis
14 Closing force module
16 Switching module
18 Storage item
20 Rocking device
22 Sliding section
24 Direction of gravitational force
26 Spring element
28 Switching point
30 Force accumulator
32 Coupling module
34*a* First pivot bearing
34*b* Second pivot bearing
36 Running ring
38 Bearing shell
40 Shaft
42*a, b* Blocking bolt
44*a, b* Guide
46 End stop module
48 Stop element
50 Structural part
52 End region
54 Damper module
56 Limit pivoting angle
57 Blocking module
58 Fixed section
O Open position
S Closing position
B Pivoting region
A Active state
P Passive state
MS Closing moment
MA Mass
MG Limit mass
R Inoperative orientation

The invention claimed is:

1. A storage compartment for an overhead region of a passenger cabin of a passenger aircraft, the storage compartment comprising:

a carrier which can be mounted in the passenger aircraft;

a pivoting part for receiving a storage item, said pivoting part being mounted on said carrier so as to be pivotable about a pivot axis in a pivoting region between an open position and a closing position; and a closing force module having a switching module by means of which said closing force module can be brought into an active state or into a passive state, in the active state, a closing moment, being greater than in the passive state, is brought about in a direction toward the closing position on said pivoting part by said closing force module, at least in a partial region of the pivoting region, said closing force module being mechanical with respect to generating the closing moment and/or with respect to a switching over between the active state and passive state;

said closing force module containing a mechanical force accumulator for generating the closing moment, said mechanical force accumulator being configured for outputting work in a form of the closing moment during a movement of said pivoting part to the closing position and being configured for receiving work by means of the closing moment during a movement of said pivoting part towards the open position, said closing force module containing at least one mechanically connecting coupling module for transmitting the closing moment between said mechanical force accumulator and said pivoting part.

2. The storage compartment according to claim 1, wherein:

said switching module contains a rocking device which is dependent on a mass of the storage item in said pivoting part; and said closing force module is brought into the active state by said switching module, which is controlled by said rocking device, when said pivoting part is loaded with the storage item of a mass greater than a predetermined limit mass, and otherwise is brought into the passive state.

3. The storage compartment according to claim 2, wherein:

said rocking device has a sliding section along which said pivoting part is displaceable in said carrier in addition to pivoting about the pivot axis, wherein, in an inoperative orientation of the storage compartment, said sliding section has at least one direction component in a direction of a gravitational force and a spring element;

on said sliding section in the direction of the gravitational force, said pivoting part is mounted on said spring element of said rocking device; and said closing force module is brought into the active state when said pivoting part is moved in said sliding section in the direction of the gravitational force beyond a switching point corresponding to the limit mass and is brought into the passive state when said pivoting part is not beyond the switching point.

4. The storage compartment according to claim 3, wherein said sliding section is oriented along a straight line extending in the direction of the gravitational force in the inoperative orientation of the storage compartment.

5. The storage compartment according to claim 2, wherein the limit mass is between 20% and 80% of a specified loading mass for the storage compartment.

6. The storage compartment according to claim 1, wherein said mechanical force accumulator contains a gas-filled compression spring and/or a load cell and/or a spring.

7. The storage compartment according to claim 1, wherein a coupling, which is brought about by said mechanically connecting coupling module, between said mechanical force accumulator and said pivoting part is achieved in the active state and is released in the passive state.

8. The storage compartment according to claim 1, wherein in an inoperative orientation of the storage compartment, the closing moment is smaller than an opening moment caused by an effect of gravitational force on said pivoting part and an inserted storage item.

9. The storage compartment according to claim 1, wherein:

said switching module contains an end stop module with a movable stop element against which said pivoting part lies in an end region of the pivoting region that is adjacent to the closing position;

said movable stop element is spring-loaded towards the open position and is configured to be movable along a spring path as far as the open position;

said closing force module is brought into the active state when said movable stop element is configured to be moved beyond a switching point corresponding to a limit mass and otherwise to be brought into the passive state;

said switching module contains a blocking module which prevents deactivation of the active state when a limit pivoting angle towards the closing position is exceeded; and said switching module contains a damper module which prevents a changing between the active state and the passive state in an interval of time after said pivoting part has passed a switching point and/or has fallen short of the limit pivoting angle and/or has experienced a change in mass of the storage item.

10. A storage compartment for an overhead region of a passenger cabin of a passenger aircraft, the storage compartment comprising:

a carrier which can be mounted in the passenger aircraft;

a pivoting part for receiving a storage item, said pivoting part being mounted on said carrier so as to be pivotable about a pivot axis in a pivoting region between an open position and a closing position; and a closing force module having a switching module by means of which said closing force module can be brought into an active state or into a passive state, in the active state, a closing moment, being greater than in the passive state, is brought about in a direction toward the closing position on said pivoting part by said closing force module, at least in a partial region of the pivoting region, said closing force module being mechanical with respect to generating the closing moment and/or with respect to a switching over between the active state and passive state;

said closing force module having a first pivot bearing about which said pivoting part is rotatable in the active state of said closing force module, and said closing force module having a second pivot bearing about which said pivoting part is rotatable in the passive state of said closing force module.

11. The storage compartment according to claim 10, wherein said closing force module contains a mechanical force accumulator for generating the closing moment, said mechanical force accumulator being configured for outputting work in a form of the closing moment during a movement of said pivoting part to the closing position and being configured for receiving work by means of the closing moment during a movement of said pivoting part towards the open position.

12. The storage compartment according to claim 10, wherein by means of said switching module, said first pivot bearing is released and said second pivot bearing is blocked in the active state and, in the passive state, said second pivot bearing is released and a said first pivot bearing is blocked.

13. The storage compartment according to claim 11, wherein said switching module has a respective blocking bolt which, for respective blocking, is retractable together into bearing parts of at least one of said first and second pivot bearings.

14. The storage compartment according to claim 10, wherein pivot axes of said first pivot bearing and said second pivot bearing do not coincide.

* * * * *